(12) United States Patent
Matei et al.

(10) Patent No.: US 11,934,756 B2
(45) Date of Patent: Mar. 19, 2024

(54) REDUCING THE NUMERICAL COMPLEXITY OF DESIGNS

(71) Applicant: Palo Alto Research Center Incorporated, Palo Alto, CA (US)

(72) Inventors: Ion Matei, Sunnyvale, CA (US); Maksym Zhenirovskyy, Mountain View, CA (US); Johan de Kleer, Los Altos, CA (US); Aleksandar B. Feldman, Santa Cruz, CA (US)

(73) Assignee: XEROX CORPORATION, Norwalk, CT (US)

( * ) Notice: Subject to any disclaimer, the term of this patent is extended or adjusted under 35 U.S.C. 154(b) by 511 days.

(21) Appl. No.: 17/112,417

(22) Filed: Dec. 4, 2020

(65) Prior Publication Data

US 2022/0180024 A1   Jun. 9, 2022

(51) Int. Cl.
*G06F 30/27* (2020.01)
*G06F 30/17* (2020.01)
*G06F 111/10* (2020.01)

(52) U.S. Cl.
CPC .............. *G06F 30/27* (2020.01); *G06F 30/17* (2020.01); *G06F 2111/10* (2020.01)

(58) Field of Classification Search
CPC .......... G06F 30/27; G06F 30/00; G06F 30/17; G06F 2111/10; G06F 2111/20; G06F 30/373; G06F 2111/12

USPC .......................................... 703/2, 20, 14, 13
See application file for complete search history.

(56) References Cited

U.S. PATENT DOCUMENTS

| | | | |
|---|---|---|---|
| 2016/0224705 A1* | 8/2016 | Joshi | G06F 30/20 |
| 2021/0117601 A1* | 4/2021 | Srinivasan | G06F 30/331 |
| 2021/0173993 A1* | 6/2021 | Raman | G06F 30/27 |

OTHER PUBLICATIONS

Zhang, Muhan et al., "D-VAE: A Variational Autoencoder for Directed Acyclic Graphs", 2019, 33rd Conference on Neural Information Processing Systems (NeurIPS 2019). (Year: 2019).*
Hagberg et al., "NetworkX Reference", Release 2.4, Oct. 17, 2019, 772 pages.
Weininger, "Smiles, a Chemical Language and Information Systems", J. Chem Inf. Comput. Sci., vol. 28, 1988, pp. 31-36.
Wellstead, "Introduction to Physical System Modeling", 1979, 256 pages.

* cited by examiner

*Primary Examiner* — Cedric Johnson
(74) *Attorney, Agent, or Firm* — Mueting Raasch Group

(57) ABSTRACT

A component library having a plurality of design components is received. Designs are predicted using the plurality of components using a machine learning model. The predicted designs comprise a subset of all possible designs using the plurality of components. A set of design criteria is received. At least one design solution is generated based on the set of design criteria and the predicted designs.

16 Claims, 12 Drawing Sheets

Flow source pattern

Effort source pattern

Dissipative component pattern

Flow store component pattern

Effort store component pattern

REDUCING THE NUMERICAL COMPLEXITY OF DESIGNS

SUMMARY

Embodiments described herein involve a method comprising receiving a component library having a plurality of design components. Designs are predicted using the plurality of components using a machine learning model. The predicted designs comprise a subset of all possible designs using the plurality of components. A set of design criteria is received. At least one design solution is generated based on the set of design criteria and the predicted designs.

A system includes a processor and a memory storing computer program instructions which when executed by the processor cause the processor to perform operations. The operations comprise receiving a component library having a plurality of design components. Designs are predicted using the plurality of components using a machine learning model. The predicted designs comprise a subset of all possible designs using the plurality of components. A set of design criteria is received. At least one design solution is generated based on the set of design criteria and the predicted designs.

A method involves receiving an electrical component library having a plurality of electrical components. Circuit designs are predicted using the plurality of electrical components using a machine learning model. The predicted circuit designs comprise a subset of all possible circuit designs using the plurality of electrical components. A set of design criteria is received. At least one design solution is generated based on the set of design criteria and the predicted circuit designs.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Electrical circuit designers rely on their intrinsic abilities and expert knowledge to generate and test feasible electrical devices. This manual trial-and-error process leads to long design cycles with multiple redesigns, higher costs, and often device designs with sub-optimal performance.

When considering both discrete components and components with continuous parameters, the design space size is $M^C \times S$, where C is the number of discrete components, M is the number of options per component, and $S \subset \mathbb{R}^N$ with N as the number of continuous parameters. Even when assuming a discretization of continuous parameters, the search space can become unmanageable. Additional complexity comes for the design simulation time T that depends on the model topology, the number of components, and the switching frequency. While many of the examples provided herein involve electrical circuits, it is to be understood that the methods and systems described can be applied to any domain in which numerous designs can be predicted. For example, the techniques described herein can be applied to mechanical, thermal, and/or magnetics domains.

Figure 1A:
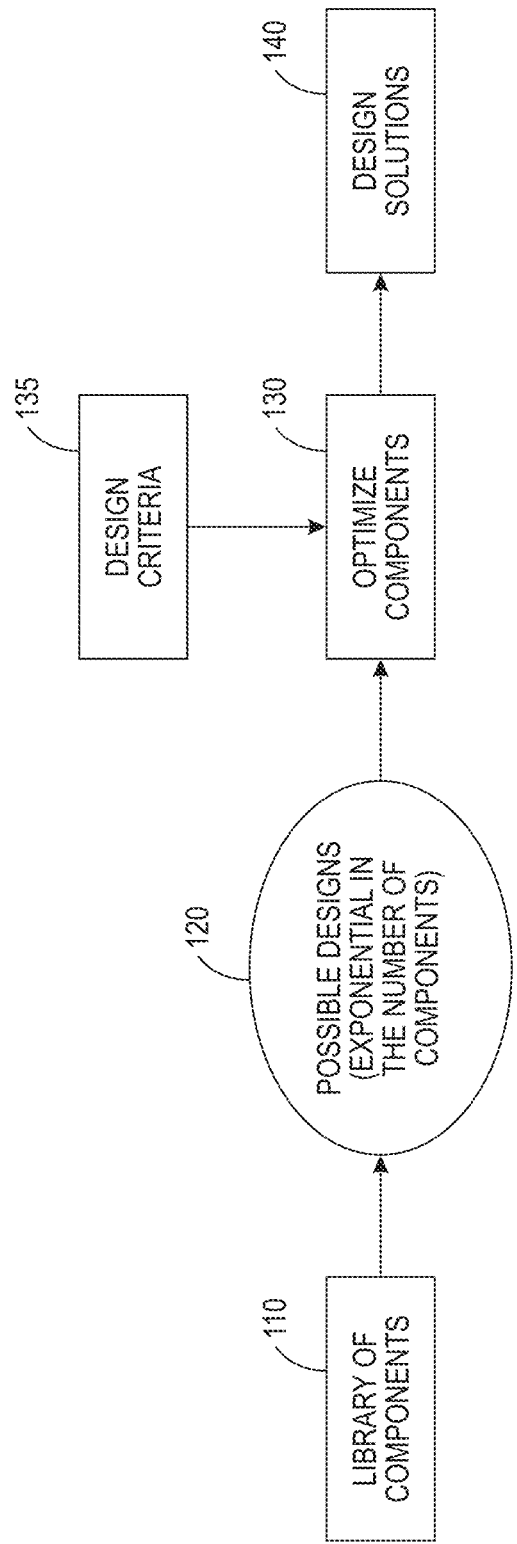
FIG. 1A illustrates an enumeration based design approach in accordance with the embodiments described herein.

The enumeration-based design approach is depicted in FIG. 1A. Based on a library of components 110, all possible designs 120 can be enumerated. For each design, the component parameters can be optimized 130 to satisfy the design criteria 135 to generate design solutions 140. This approach is not be scalable since the number of possible designs is exponential in the number of components.

To overcome the scalability challenge, embodiments described herein involve a system and method for reducing the design space size, by generating a small set of tentative designs that will be further processed and optimized until a feasible design is obtained. The design space can be reduced by using machine learning models and algorithms. Machine learning relates to methods and circuitry that can learn from data and make predictions based on data. In contrast to methods or circuitry that follow static program instructions, machine learning methods and circuitry can include deriving a model from example inputs (such as a training set) and then making data-driven predictions. Machine learning is generally related to optimization. Some problems can be expressed in terms of minimizing a loss function on a training set, where the loss function describes the disparity between the predictions of the model being trained and observable data.

Machine learning methods are generally divided into two phases: training and inference. One common way of training certain machine learning models involves attempting to minimize a loss function over a training set of data. The loss function describes the disparity between the predictions of the model being trained and observable data.

Figure 1B:
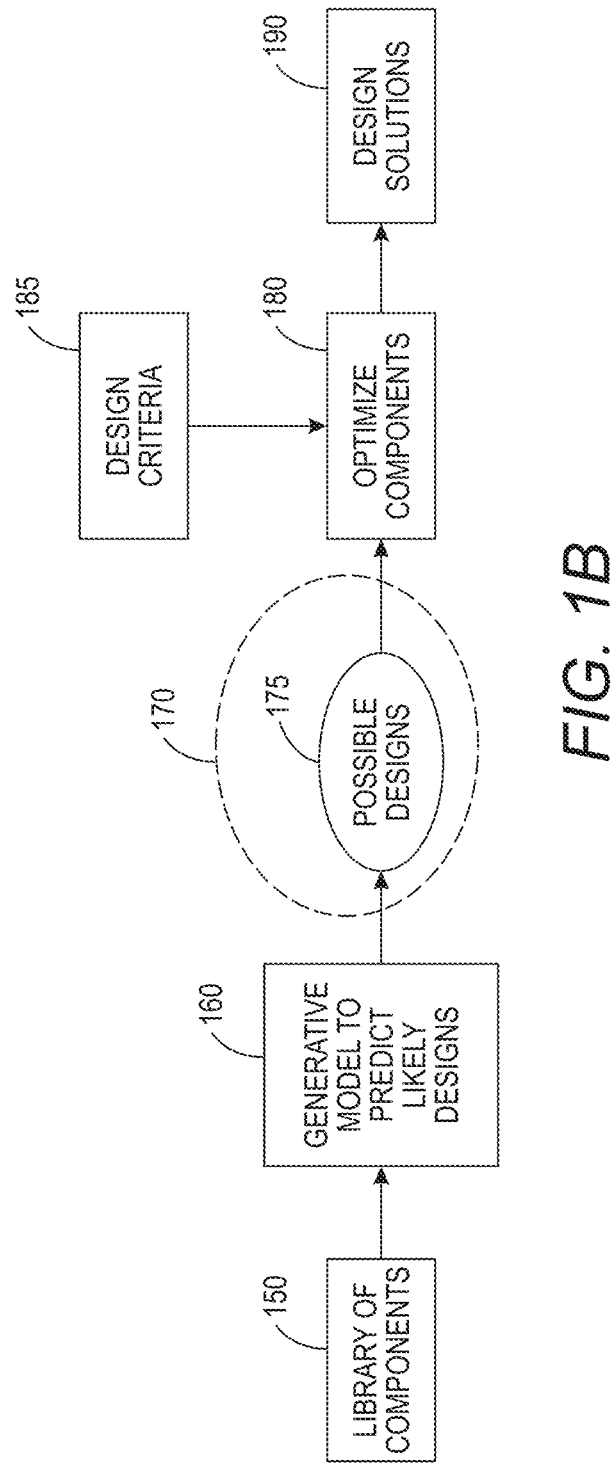
FIG. 1B shows a design approach that utilizes machine learning techniques to reduce the number of predicted designs in accordance with the embodiments described herein.

FIG. 1B shows a design approach that utilizes machine learning techniques to reduce the number of predicted designs based on an input library of components 150. According to various configurations, a generative model 160 is used to produce a reduced number of feasible electrical circuit designs 175 from all possible designs 170. For each of the reduced set of possible designs 175 the components may be optimized 180 based on the design criteria 185 to generate design solutions 190.

Figure 2:
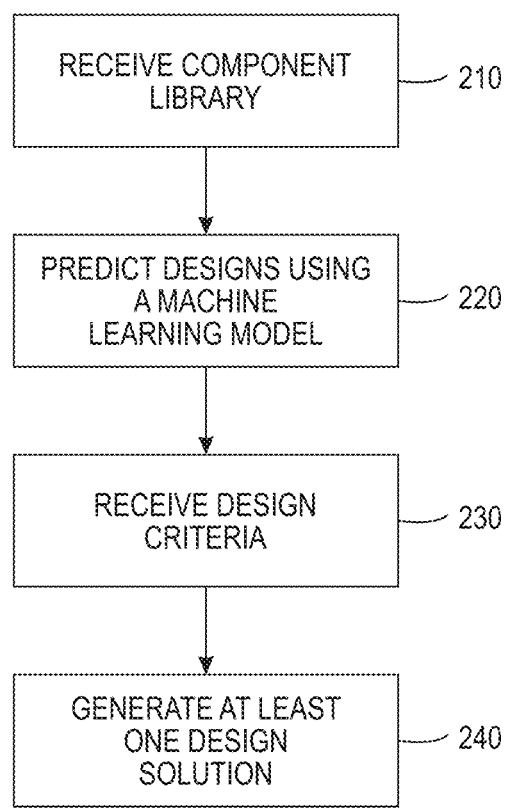
FIG. 2 shows a process for generating design solutions in accordance with embodiments described herein.

FIG. 2 shows a process for generating design solutions in accordance with embodiments described herein. A component library is received 210. The component library may be stored on a database, for example. The component library can include any type of components for any type of designs. For example, the component library may include electrical components, mechanical components, thermal components, magnetic components, and fluid dynamics components. According to various configurations, the component library is a generic library such that components can be used in any type of feasible design domain.

Possible designs are predicted 220 based on a machine learning model. The machine learning model may be a generative model, for example. According to various configurations, the machine learning model is trained using a plurality of electrical circuits. Each of the plurality of electrical circuits may be transformed to a graph representation. In some cases, the graph representations are transformed to a respective string representation.

According to various configurations, the training data comprises a plurality of components broken up into component types. For example, the component types may include one or more of flow sources, effort sources, flow stores, effort stores, dissipators, transformers, and gyrators. In some cases, the component types are tokenized.

According to various configurations described herein, the machine learning model is trained using examples from physical domains other than electrical domains. For example, the machine learning model may be trained using examples from mechanical and/or thermal domains.

Design criteria are received 230. The design criteria may be received from a user via a user interface, for example. At least one design solution is generated 240 based on the possible predicted designs and the design criteria. According to various configurations, a user can further reduce the number of design solutions by adding additional design criteria after the initial design solutions are generated.

According to various configurations, the machine learning model is at least partially trained using a set of electrical circuits examples expressed in the Modelica language. In what follows, we describe the steps for generating the training data, selecting a model architecture, training the generative model and making predictions. In this step the electrical circuits expressed in the Modelica language are processed and transformed into a format amenable for training a generative model. It is based on the following sub-steps. According to various configurations, the Modelica models are parsed using modparc, a Modelica parser in Python based on parser generator. By processing the model, a graph is generated that depicts the connections between the model components. A parser can be used to extract the model equations. From the list of equations, equations that contain the "connect clause are extracted. For example, the connect expression "connect(C1.n, C3.n)" the following inferences can be made:

There are four nodes involved: C1, C1.n, C3, C3.n
Node C1 is connected to the node C1.n
Node C3 is connected to the node C3.n
Node C1.n is connected to the node C3.n The nodes C1, C1.n, C3, C3.n may be added to a graph object created using the "NetworkX" Python package dedicated to the creation, manipulation, and study of the structure, dynamics, and functions of complex networks for graphs. After all "connect" clauses are processed, a "NetworkX" graph object is created.

Figure 3:
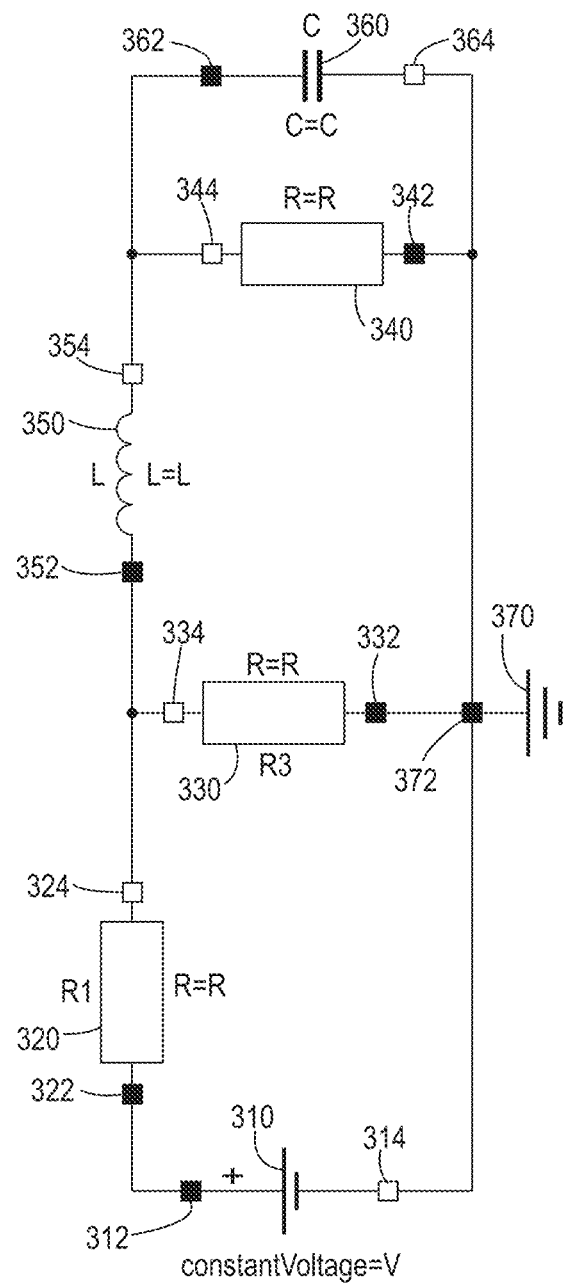
FIG. 3 shows an example circuit in accordance with embodiments described herein.
Figure 4:
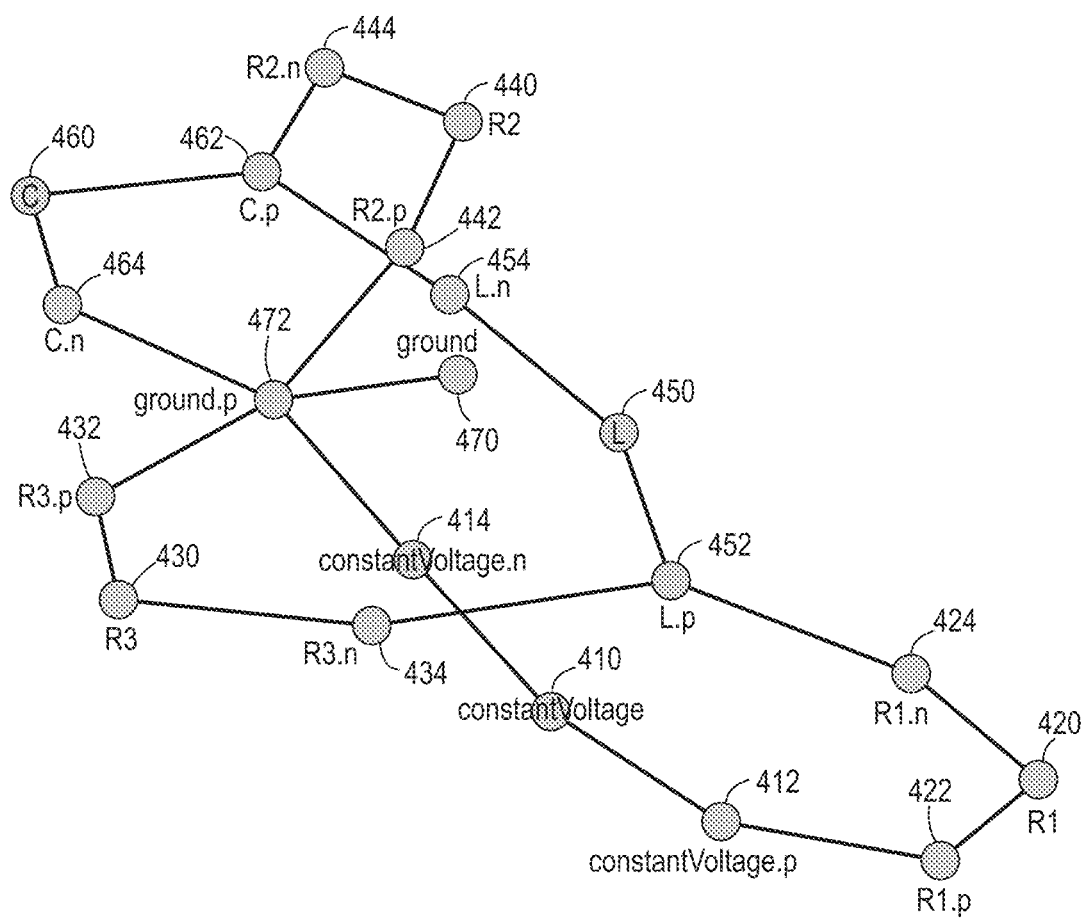
FIG. 4 shows a graph representation of the electrical circuit of FIG. 3 in accordance with embodiments described herein.
Figure 5A:
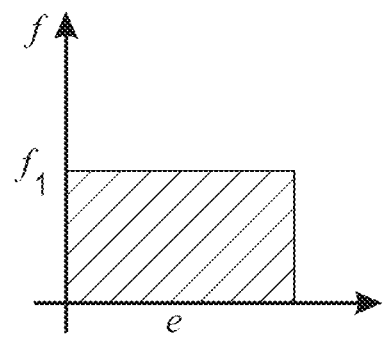
FIGS. 5A-5E illustrate the constitutive relations of generic component types in accordance with embodiments described herein.
Figure 5B:
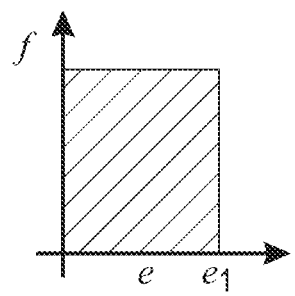
Figure 5C:
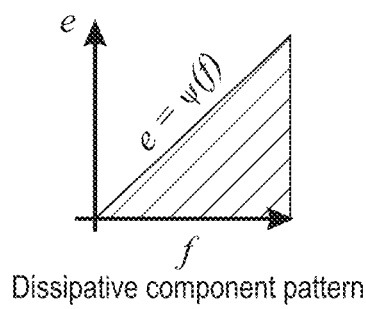
Figure 5D:
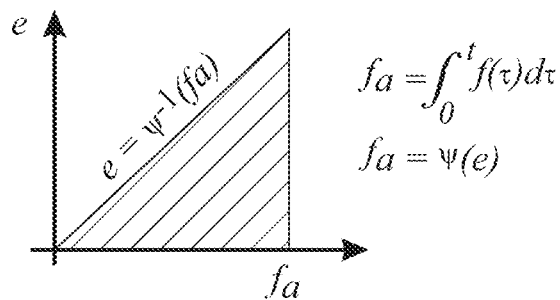
Figure 5E:
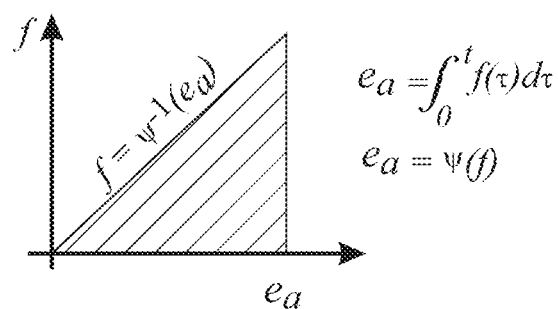

FIG. 3 shows an example circuit and the resulting graph created from the electrical circuit is shown in FIG. 4. For example, the electrical circuit depicted in FIG. 3 has the graph representation shown in FIG. 4. The circuit has seven components: a voltage source 310, 410, a first resistor, R1, 330, 430, a second resistor, R2, 340, 440, a third resistor, R3, 330, 430, an inductor, L, 350, 450, a capacitor, C, 360, 460, and a ground 370, 470.

Each component has at least one connection point. Each component is connected to other components through the connection points. Specifically, the voltage source has connection points constantVoltage.p 312, 412 and constantVoltage.n 314, 414. The first resistor has connection points R1.p 322, 422 and R1.n 324, 424. The second resistor has connection points R2.p 342, 442 and R2.n 344, 444. The third resistor has connection points R3.p 332, 432 and R1.n 334, 434. The inductor has connection points L.p 352, 452 and L.n 354, 454. The capacitor has connection points C.p 362, 462 and C.n 364, 464. Finally, the ground has connection point ground.p 372, 472.

According to various configurations, the graph representation is converted to a string representation. In some cases, the graph representation is converted to the string representation using the simplified molecular-input line-entry system (SMILES) formalism. SMILES is a specification in the form of a line notation for describing the structure of chemical species using short ASCII strings. The main characteristic of the string representation is the loop breaking and branching. The loop braking brakes the graph's loops and converts graphs into trees. The branching may be represented using round parenthesis. According to various configurations, to generate the SMILE string representation, the "pysmiles" Python package may be used. The "pysmiles" may be modified so that every component is represented by its full type path in the Modelica library. For example, the graph depicted in FIG. 4 has the following SMILE representation.

---

[Modelica.Electrical.Analog.Basic.Ground][Modelica.Electrical.Analog.Basic.Ground.p]

%1%2%3[Modelica.Electrical.Analog.Sources.ConstantVoltage.n][Modelica.Electrical.

Analog.Sources.ConstantVoltage][Modelica.Electrical.Analog.Sources.ConstantVoltage.

p][Modelica.Electrical.Analog.Basic.Resistor.p][Modelica.Electrical.Analog.Basic.Resistor]

[Modelica.Electrical.Analog.Basic.Resistor.n][Modelica.Electrical.Analog.Basic.Inductor.

p]([Modelica.Electrical.Analog.Basic.Resistor.n][Modelica.Electrical.Analog.Basic.

Resistor][Modelica.Electrical.Analog.Basic.Resistor.p]%3)[Modelica.Electrical.Analog.

Basic.Inductor][Modelica.Electrical.Analog.Basic.Inductor.n][Modelica.Electrical.Analog.

Basic.Capacitor.p]([Modelica.Electrical.Analog.Basic.Resistor.n][Modelica.Electrical.

Analog.Basic.Resistor][Modelica.Electrical.Analog.Basic.Resistor.p]%2)[Modelica.

Electrical.Analog.Basic.Capacitor][Modelica.Electrical.Analog.Basic.Capacitor.n]%1

Note that the loop breaking was implemented by introducing special keywords, namely % 1, % 2, and % 3. For example [Modelica.Electrical.Analog.Basic.Resistor.p]% 3 means that [Modelica.Electrical.Analog.Basic.Resistor.p] is connected to [Modelica.Electrical.Analog.Basic.Ground.p]. The first branching happens after [Modelica.Electrical.Analog.Basic.Inductor.p]. It depicted the connection of resistor R3 to the inductor L and the ground through the SMILE representation:

---

[Modelica.Electrical.Analog.Basic.Resistor.n][Modelica.Electrical.
Analog.Basic.Resistor][Modelica.Electrical.Analog.Basic.Resistor.p]
%3

---

As described herein, training a statistically significant prediction model may involve using large training data sets. To increase the training data set size, electrical circuit examples may be supplemented with examples from other physical domains (e.g., mechanical, thermal). To make the examples compatible, the component types can be converted to domain agnostic types. For example, the notion of generalized system variables such as the effort and flow variables may be used describe the component behaviors. Effort is normally visualized as an across variable and flow as a through variable. An across variable may involve a two-terminal meter, connected across two points in space. For example, voltage and pressure may be considered across variables. A through variable may involve a through meter that it is inserted into a system and measures the rate of flow through itself of a physically intensive variable. For example, current and fluid flow can be considered flow variables. The product between the effort and flow variables have the physical meaning of instantaneous power. The physical component's behavior is described a set of constraints between the effort and flow variables called constitutive relations. The physical variables in a system are the media by which energy is transformed, and by suitable interpretation of physical variables, many systems can be reduced to a common way to handle energy. Physical components can be classified based on how they process energy: flow and effort sources, flow and effort stores and/or dissipators. The constitutive relations of these types of components are depicted in FIGS. 5A-5E.

The component types shown in FIGS. 5A-5E are one-port or two-terminal devices. They are not always enough, and hence two-port devices may also be used. Two port devices may include, for example, transformers and gyrators. The constitutive relations for the transformers and gyrators are $e_1=g_1(e_2)$, $f_1=g_2(f_2)$ and $e_1=g_1(f_2)$, $f_1=g_2(e_2)$, respectively, with $e_1 f_1 = e_2 f_2$ the power conservation constraint. This classification can be applied to multiples physical domains such as mechanical (translational and rotational), thermal, fluid and magnetical domains. For example, the SMILE representation of the graph shown in FIG. 4 in terms of domain agnostic types is given by:

---

[Ground][Ground.p]%1%2%3[EffortSource.n][EffortSource]
[EffortSource.p][Dissipator.p]Dissipator][Dissipator.n][EffortStore.p]
([Dissipator.n][Dissipator][Dissipator.p]%2)[EffortStore][EffortStore.n]
[FlowStore.p]([Dissipator.n][Dissipator][Dissipator.p]%3)[FlowStore]
[FlowStore.n]%1

---

Here, the voltage source is represented by the effort source, the resistors are represented by the dissipators, the inductor is represented by the effort store, and the capacitor is represented by the flow store.

According to various configurations, each type of node (components and component connections) may be tokenized, with an associated integer index. Here, the negative and positive pins (connectors) are no longer distinguished and only one type of connector is used for both. The collection of all tokens defines the dictionary. For the example shown in FIG. 4, the resulting dictionary is:

---

{
"PAD": 0,
"[ground.con]": 1,
"[ground]": 2,
"[dissipator.con]": 3,
"[effortsource.con]": 4,
"(": 5,
"[effortsource]": 6,
"[flowstore.con]": 7,
"[dissipator]": 8,
"[flowstore]": 9,
"[effortstore]": 10,
")": 11,
"[effortstore.con]": 12
}

---

Token "PAD" may be added for string alignment and indicates the end of the string as well. By considering all possible types, the resulting dictionary has a size of 45.

Figure 6:
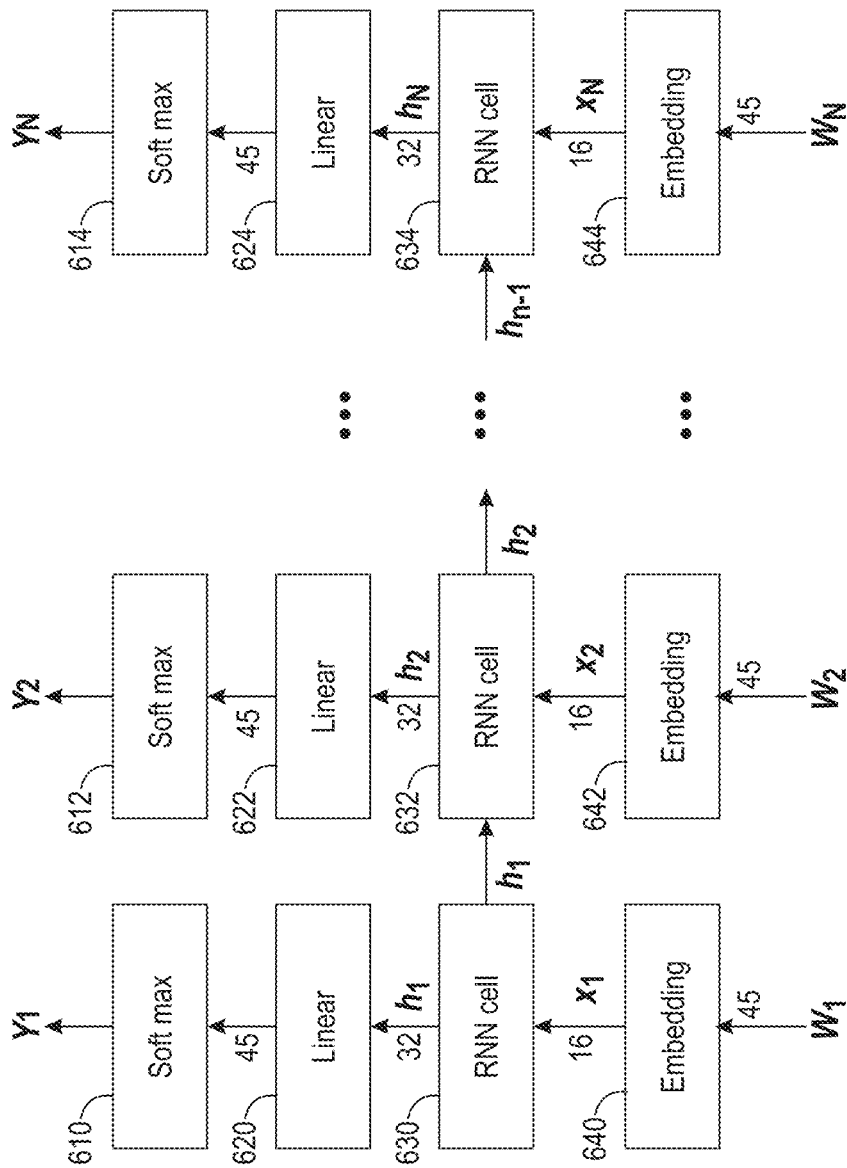
FIG. 6 shows the example model architecture in accordance with embodiments described herein.

The model architecture is shown in FIG. 6. A sentence of size N is passed as an input to the model. The sentence may be a SMILE representation, for example. In some cases, the sentence is a tokenized SMILE representation. Each word/token in the sentence is represented using a one hot encoding scheme. For example the token "PAD" is encoded as [1, 0, . . . , 0]. Each token is passed through an embedding layer 640, 642, 644 that projects the one hot encoded token into a vector of reals of size 16. According to various embodiments, the embedding layer may be identical for each token. In some cases, the embedding layer is different for at least one token.

The projected token is passed through a recurrent neural network (RNN) cell 630, 632, 634, with a hidden layer of size 32. The state of the RNN cell (a latent variable, for example) is passed through a linear layer 620, 622, 624 and converted 610, 612, 614 to a one hot encoding representation using the "softmax" function.

Figure 7:
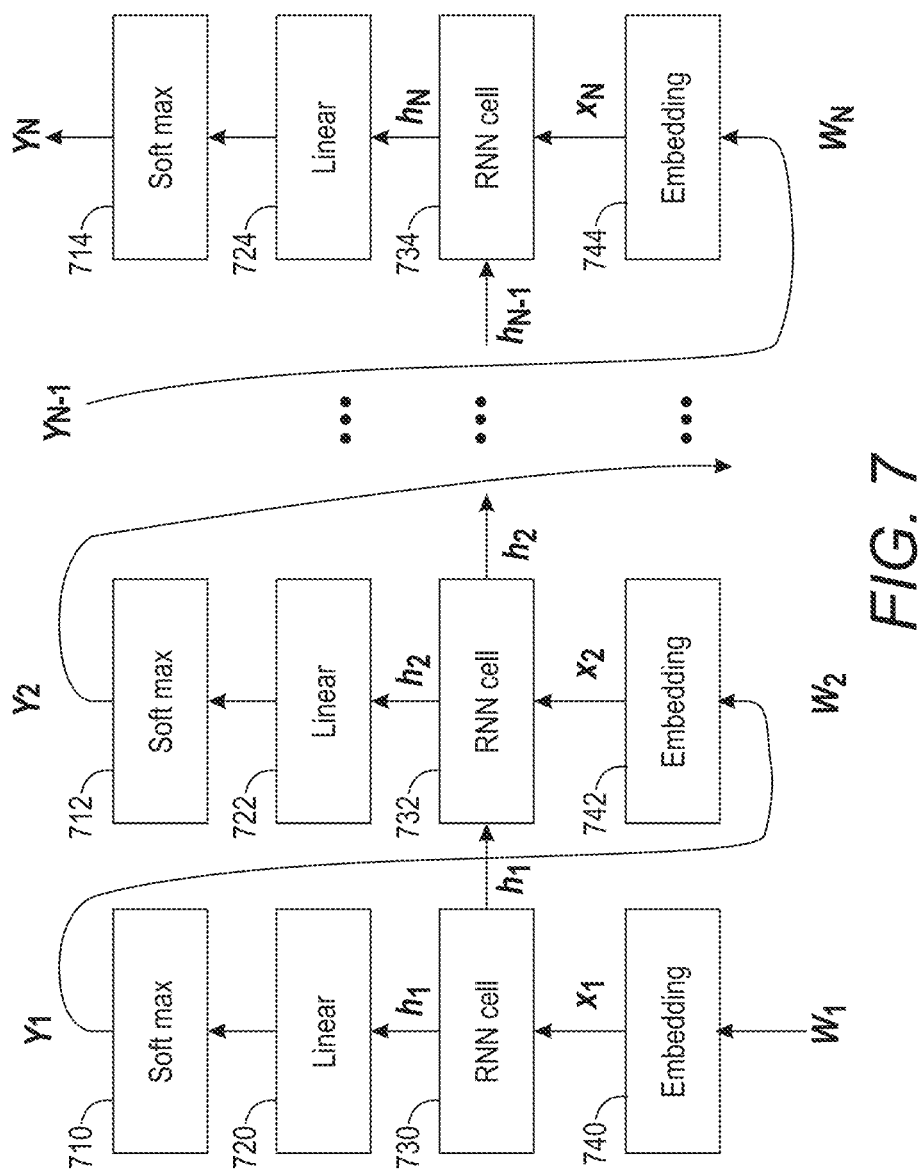
FIG. 7 illustrates an example prediction model in accordance with embodiments described herein.

In this example, 63 Modelica models were used covering the electrical, mechanical and thermal domains. The negative log-likelihood loss was used as loss function. The prediction model is shown in FIG. 7, where predictions at previous time instants are used as inputs for the next instants. According to various configurations, the prediction starts with seed token, $W_1$, e.g., the "ground" and "ground.con" tokens and this is input into the respective embedding layer 740. The inputs $W_2$ through $W_N$ are input into their respective embedding layers 742, 744.

The projected token is passed through a recurrent neural network (RNN) cell 730, 732, 734, with a hidden layer of size 32. The state of the RNN cell is passed through a linear layer 720, 722, 724 and converted 710, 712, 714 to a one hot encoding representation that represents the final design solutions.

In some cases, several predictions are retained. The predictions may be retained based on their probabilities. Given a starting initial component, the generative model predicts the next component. The prediction is based on associating probabilities to possible components. Instead of choosing the component with the highest probability, the first two best components may be chosen. This results in two separate combinations of two components. The generative model may be used again to generate the third possible component. This results in four partial designs with three components. This process may be iteratively repeated a number of times based on the particular application.

Only two predictions may be retained in some cases. In this example, if only two predictions are retained the total predictions follow a binary tree structure, and the number of predictions is $2^N$. Each prediction may be converted from the SMILE representation to a graph structure, similar to the graph shown in FIG. 4, for example.

In some cases, additional feasibility conditions may be imposed to ensure that the predicted model can be physically implemented. For example, two such feasibility conditions are: if "node.con" appears then "node" must be present and "node.con" must be connected to "node". According to various configurations, connections of the type ("node1.con", "node2") and ("node1", "node2") are not allowed. In other words, components can interact through their interfaces only. Hence the only type of connections that may be allowed are ("node1.con", "node2.con") and ("node1.con", "node1").

Figure 8A:
FIGS. 8A-8F shows several examples of predictions made by the trained generative model.
Figure 8B:
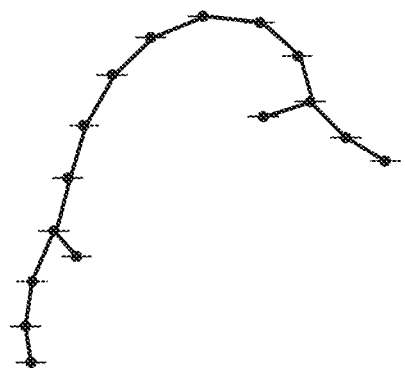
Figure 8C:
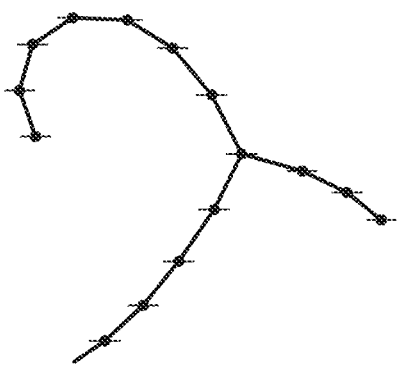
Figure 8D:
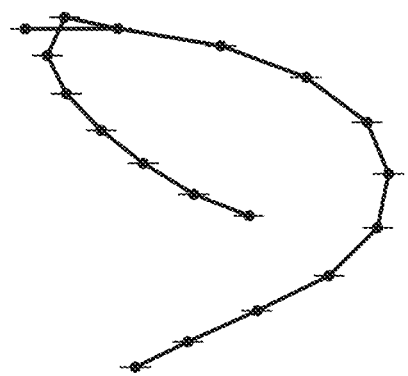
Figure 8E:
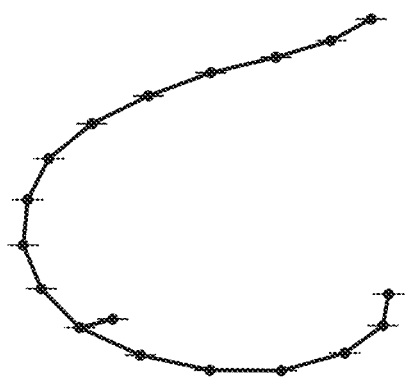
Figure 8F:
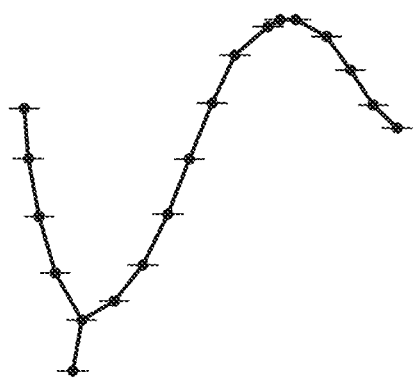

FIG. 8F shows several examples of predictions made by the trained generative model. The graph structures are converted back into Modelica models by setting a domain (e.g., electrical) and replacing the domain agnostic types with concrete instantiations, e.g., dissipators are replaced by resistors, conductors or diodes. One graph can generate several Modelica models. The parameters of these models are further tuned so that the design solution satisfies given design criteria.

Figure 9:
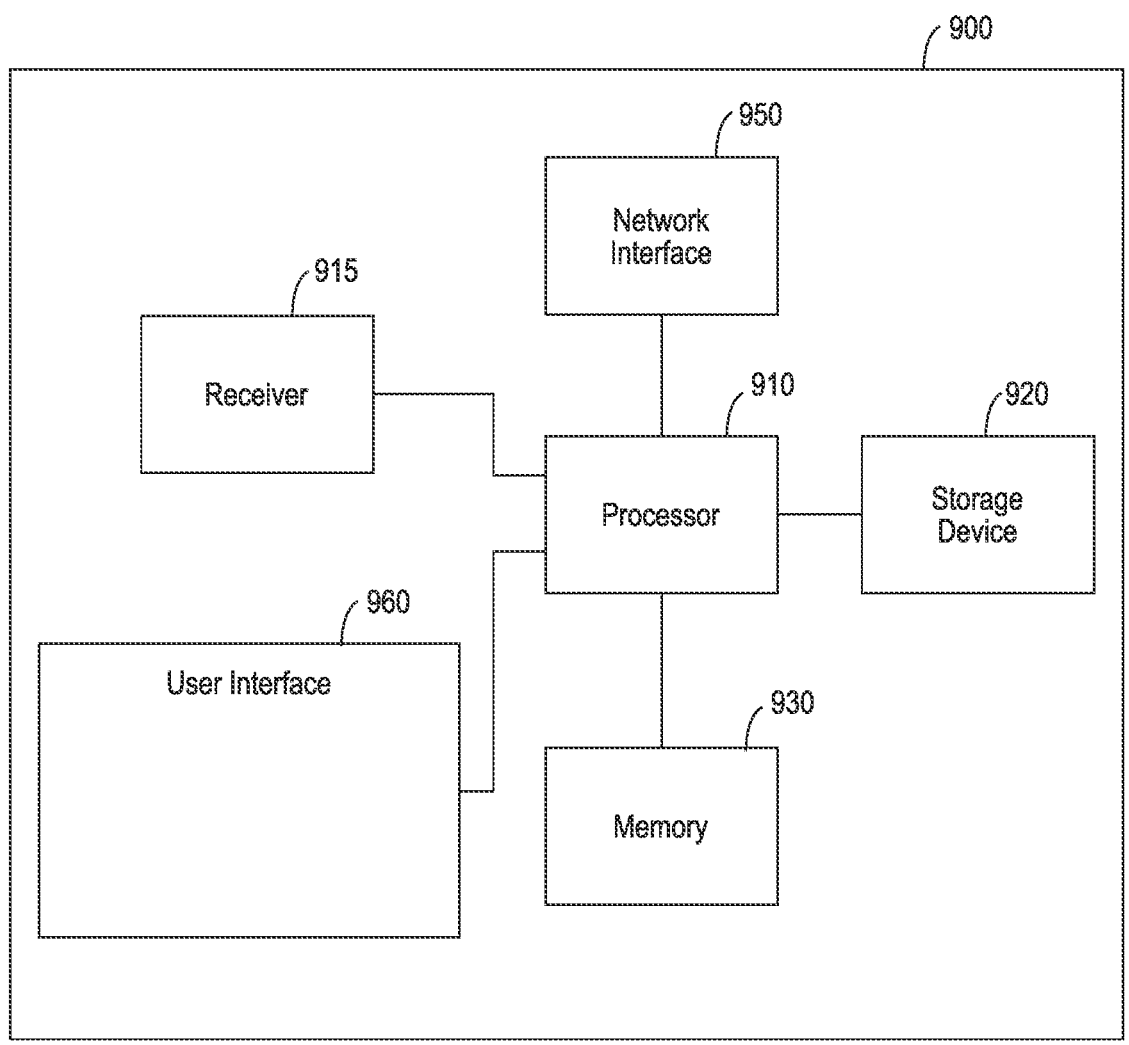
FIG. 9 shows a block diagram of a system capable of implementing embodiments described herein.

The above-described methods can be implemented on a computer using well-known computer processors, memory units, storage devices, computer software, and other components. A high-level block diagram of such a computer is illustrated in FIG. 9. Computer 900 contains a processor 910, which controls the overall operation of the computer 900 by executing computer program instructions which define such operation. It is to be understood that the processor 910 can include any type of device capable of executing instructions. For example, the processor 910 may include one or more of a central processing unit (CPU), a graphical processing unit (GPU), a field-programmable gate array (FPGA), and an application-specific integrated circuit (ASIC). The computer program instructions may be stored in a storage device 920 (e.g., magnetic disk) and loaded into memory 930 when execution of the computer program instructions is desired. Thus, the steps of the methods described herein may be defined by the computer program instructions stored in the memory 930 and controlled by the processor 910 executing the computer program instructions. According to various implementations, the computer may perform method steps as part of an in-house server or cloud based service. The computer 900 may include one or more network interfaces 950 for communicating with other devices via a network. The computer 900 also includes other input/output devices 960 that enable user interaction with the computer 900 (e.g., display, keyboard, mouse, speakers, buttons, etc.). According to various embodiments, FIG. 9 is a high level representation of possible components of a computer for illustrative purposes and the computer may contain other components.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate ink jet ejector diagnostics as described above.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. A method comprising:
   training a machine learning model using training data;
   transforming the training data into one or more different representations, the one or more different representations comprising a simplified molecular-input line-entry system (SMILES) representation;
   receiving a component library having a plurality of design components;
   predicting designs using the plurality of components using the machine learning model and the one or more different representations, the predicted designs comprising a subset of all possible designs using the plurality of components;
   receiving a set of design criteria; and
   generating at least one design solution based on the set of design criteria and the predicted designs.

2. The method of claim 1, further comprising:
   optimizing one or more components based on the predicted designs and the set of design criteria; and
   generating at least one design solution based on optimized components.

3. The method of claim 1, wherein the machine learning model is a generative model.

4. The method of claim 1, further comprising training the machine learning model using a plurality of electrical circuits.

5. The method of claim 1, further comprising training the machine learning model using training data from one or more of electrical, mechanical, and thermal domains.

6. The method of claim 5, wherein transforming the training data into one or more different representations comprises:
   transforming the training data to a graph representation; and transforming the graph representation to the simplified molecular-input line-entry system (SMILES) representation.

7. The method of claim 1, wherein training the machine learning model using examples from physical domains comprises training the machine learning model using at least one of mechanical, and thermal training data.

8. The method of claim 1, wherein the training data comprises a plurality of components broken up into component types.

9. The method of claim 8, wherein the component types comprise one or more of flow sources, effort sources, flow stores, effort stores, dissipators, transformers, and gyrators.

10. The method of claim 8, further comprising tokenizing the component types.

11. A system, comprising:
a processor; and
a memory storing computer program instructions which when executed by the processor cause the processor to perform operations comprising:
train a machine learning model using training data;
transform the training data into one or more different representations, the one or more different representations comprising a simplified molecular-input line-entry system (SMILES) representation;
receive a component library having a plurality of components;
predict designs using the plurality of components using the machine learning model and the one or more different representations, the predicted designs comprising a subset of all possible designs using the plurality of components;
receive a set of design criteria; and
generate at least one design solution based on the set of design criteria and the predicted designs.

12. The system of claim 11, wherein the processor is configured to:
optimize one or more components based on the predicted designs and the set of design criteria; and
generate at least one design solution based on optimized components.

13. The system of claim 11, wherein the machine learning model is a generative model.

14. The system of claim 11, further comprising training the machine learning model using training data from one or more of electrical, mechanical, and thermal domains.

15. The system of claim 14, wherein transforming the training data into one or more different representations comprises:
transforming the training data to a graph representation; and
transforming the graph representation to the simplified molecular-input line-entry system (SMILES) representation.

16. A method comprising:
training a machine learning model using training data;
transforming the training data into one or more different representations, the one or more different representations comprising a simplified molecular-input line-entry system (SMILES) representation;
receiving an electrical component library having a plurality of electrical components;
predicting circuit designs using the plurality of electrical components using the machine learning model and the one or more different representations, the predicted circuit designs comprising a subset of all possible circuit designs using the plurality of electrical components;
receiving a set of design criteria; and
generating at least one design solution based on the set of design criteria and the predicted circuit designs.

* * * * *